United States Patent Office 3,103,413
Patented Sept. 10, 1963

3,103,413
SODIUM CARBONATE MANUFACTURE
Ernest Blumenthal, Northwich, England, assignor to Imperial Chemical Industries Limited, London, England, a corporation of Great Britain
No Drawing. Filed Nov. 14, 1960, Ser. No. 68,696
Claims priority, application Great Britain Nov. 27, 1959
5 Claims. (Cl. 23—63)

This invention relates to processes for manufacturing sodium carbonate and sodium carbonate monohydrate by the action of carbon dioxide on caustic soda solutions particularly those of high concentration produced by the electrolysis of brine in modern mercury-type cells.

Processes for carbonating caustic soda liquors produced in electrolytic brine cells are known but they require a supply of heat or yield sodium bicarbonate, or make use of only part of the caustic soda and so leave over end-liquors. Further process stages are thus needed before sodium carbonate can be isolated as such.

I have now discovered how to produce from strong caustic soda solutions, such for example as are produced in modern mercury cells, sodium carbonate and its monohydrate directly and without the need to supply any additional heat to the system.

I have also discovered how to separate physically the carbonation stage from the crystallisation or precipitation stage. This is of the highest importance and value because it means that the two stages can be carried out separately in equipment specially designed for the purpose. In other processes involving crystallisation and carbonation, such as the ammonia soda process, carbonation and precipitation take place in the same vessel. This vessel contains a great deal of liquor, which can promote good crystal growth, but the presence of this liquor imposes a considerable back-pressure on the carbonating gases and necessitates expensive gas compression.

By separating the two stages the crystallisation can be carried out for example in a thick bed of crystals if this is desired, or in mother liquors of compositions particularly conducive to the type of crystal growth required, and particularly the carbonation can take place in packed towers or similar vessels offering low pressure drop to the passage of gas. There is thus no need for a supply of carbon dioxide under pressure as is required in known processes, and consequently my process can operate without compression costs, and use as a cheap source of carbon dioxide flue gases which it would be uneconomic to compress for use in known processes.

According to the first embodiment of my invention I provide a process for making sodium carbonate monohydrate by the action of carbon dioxide on caustic soda liquors comprising a carbonation stage, in which a mother liquor from a crystallisation stage and containing less than 20% by weight of NaOH and more than 6% by weight of $Na_2CO_3$, but preferably less than 12% NaOH and more than 14% $Na_2CO_3$, is reacted at a temperature above 30° C. with sufficient of a carbon dioxide-containing gas to give a carbonated liquor in which substantially all caustic soda has been converted into sodium carbonate, followed by said crystallisation stage in which carbonated liquor from said carbonation stage is reacted with a caustic soda liquor containing at least 56% and not more than about 63% by weight of NaOH, whereby sodium carbonate monohydrate is precipitated and separated by suitable means.

According to the second embodiment of my invention I make anhydrous sodium carbonate by a process comprising all the features described in the first embodiment except that the caustic soda liquor that is reacted with carbonated liquor in the crystallisation stage contains at least 63% by weight of NaOH, whereby anhydrous sodium carbonate is precipitated and separated by suitable means.

The essential requirement for the complete conversion of the NaOH in the cell liquor to precipitated sodium carbonate monohydrate is that all the water introduced into the process with the cell liquor and with the carbonating gas, and also the water formed by the reaction between NaOH and $CO_2$ to form $Na_2CO_3$, should be evaporated. To achieve this most efficiently without the need for added heat, the cell liquor should contain at least 56% by weight of NaOH if sodium carbonate monohydrate is required, and at least 63% if anhydrous sodium carbonate is required. The heat of reaction is sufficient to evaporate the amounts of water involved. The heat of reaction is liberated partly in the crystalliser in the form of a heat of dilution and crystallisation, partly as heat of carbonation of the liquor in the carbonator. Sodium carbonate monohydrate could be obtained when the cell liquor contains less than 56% of NaOH but only if extra heat is supplied to the system; likewise one could possibly obtain sodium carbonate monohydrate when the cell liquor contains more than 63% of NaOH, but only if a significant proportion of the heat of reaction were lost for example by failing to insulate the plant thermally.

Water is removed most readily in the carbonator where it enters the gas phase and is carried away with the inert constituents of the flue gas. If all the water is removed at that stage some scaling by carbonate complexes will occur in the upper part of the carbonator, while the liquor in the lower part is unsaturated. Scale can be removed by using two carbonators in series and using each alternately as top or bottom of the system. The scale formed whilst a carbonator is on "top" duty is thus removed when it is on "bottom" duty.

Alternatively, scale formation can be obviated by removing part of the water in a vacuum crystalliser. This produces a cold liquor for recirculation to the carbonator. When this liquor enters the carbonator water vapour from the ascending gas stream condenses in it and the consequent dilution makes precipitation impossible.

Another alternative is to feed a rather stronger caustic liquor to the process, for example the strongest liquor mercury cells can produce. Less water is thereby added to the process than is permitted by the minimum 56% concentration. The difference is added to the liquor entering the carbonator to dilute it.

Crystallisation takes place in one or several vessels at temperatures between 8° and 108° C., but temperatures between about 50° and 80° C. are preferred. If several vessels are used part of one or both reagents need not be added to the first vessel. If water vapour is removed by vacuum evaporation during crystallisation to obviate scaling in the carbonator, only the last crystallising vessel need work under vacuum.

To regulate the temperature of the liquor leaving the carbonator to a value suitable for the introduction of the liquor to the crystallisers, the gas entering the carbonator must have a suitable dewpoint. If it is desired to have the liquor leaving the carbonator at a high temperature, the dewpoint of the gas may have to exceed that of natural flue gas. In that case it is necessary to enrich the gas with water vapour before it enters the carbonator and recover the heat value of the water vapour from the gas leaving the carbonator. This is achieved readily by letting the gas leaving the carbonator heat up a cycling stream of water and use the hot water to humidify the gas going to the carbonator.

In making anhydrous sodium carbonate according to the second embodiment of the invention the liquor issuing from the carbonator may if desired be split into two portions. The first is then mixed in the crystallising system with cell liquor containing at least 63% NaOH and the heat of dilution of the latter raises the temperature of the mixture to about 90° C. which is sufficient to precipitate in the form of anhydrous sodium carbonate about 75% of the total Na$_2$O present. This sodium carbonate is separated and the mother liquor mixed with the second of the two portions of carbonated liquor whereupon sodium carbonate monohydrate is precipitated. This monohydrate is returned to the crystalliser in which the first portion of carbonated liquor is being mixed with cold liquor containing at least 63% NaOH or, if desired, into a secondary vessel containing the magma from the crystalliser, and is converted into sodium carbonate. The monohydrate may if desired be converted into anhydrous sodium carbonate in other ways, for example by reaction with concentrated caustic soda solutions in a separate system. As already described, the end-crystallisation stages can be operated under reduced pressure in order to give a colder mother liquor which on entering the carbonator will dilute itself by condensation of water vapour and so by avoiding supersaturation prevent scaling with carbonate complexes.

*Example 1*

667 kilos of a mother liquor from crystallisation stage and at a temperature of 72° C. and containing 80 kilos of NaOH and 94.7 kilos of Na$_2$CO$_3$ are introduced into the top of a packed column into the bottom of which is passing flue gas containing 11.0% of CO$_2$ and being nearly saturated with water vapour at 35° C. In the column 44 kilos of CO$_2$ are absorbed and 62.8 kilos of water evaporated by the heat of reaction, and there issues from the bottom 648 kilos of a liquor at 60.2° C. and containing 200 kilos of Na$_2$CO$_3$ and substantially no other dissolved material. This liquor, which is in effect a 30.5% solution of Na$_2$CO$_3$, is mixed in a crystalliser at atmospheric pressure with 142.8 kilos of a 56% NaOH liquor at 60° C. whereupon the temperature rises to 72° C. and 124 kilos of sodium carbonate monohydrate are precipitated, and a mother liquor containing 14.2% Na$_2$CO$_3$ and 12.0% NaOH left.

*Example 2*

650 kilos of a mother liquor from a crystallisation stage and at a temperature of 50° C. and containing 80 kilos of NaOH and 91 kilos of Na$_2$CO$_3$ are introduced into the top of a packed column, into the bottom of which is passing flue gas containing 11.0% CO$_2$ and being nearly saturated with water vapour at 34° C. In the column 44 kilos of CO$_2$ are absorbed and 39.7 kilos of water evaporated. The temperature at the top of the column rises to 66.8° C., that at the bottom to 59.4° C., and from the bottom issue 654 kilos of a liquor at the latter temperature and containing 197 kilos of Na$_2$CO$_3$. This liquor which is in effect a 30.1% solution of Na$_2$CO$_3$ is mixed with 142.8 kilos of a 56% NaOH liquor at 60° C. in a multi-stage crystalliser in which the end stages are operated under reduced pressure. The net result of the gain of heat by dilution of the 56% NaOH liquor and the loss of heat by evaporation in the reduced-pressure stages is to bring the temperature of the mother liquor down to 50° C.; 124 kilos of sodium carbonate monohydrate are precipitated, and collected by suitable means.

*Example 3*

690 kilos of a mother liquor at 81.1° C. and containing 101.5 kilos of Na$_2$CO$_3$ and 80.0 kilos of NaOH are introduced into the top of a packed column into the bottom of which is passing a flue gas containing 11.0% CO$_2$ and being virtually saturated with water vapour at 63° C. In the column 44 kilos of CO$_2$ are absorbed and 46 kilos of water evaporated, and there issues from the bottom 687 kilos of a carbonated liquor at 68.6° C. containing 208 kilos of Na$_2$CO$_3$. This liquor is split into two substantially equal portions. One of these, amounting to 342 kilos, passes directly to the main crystalliser where it is mixed with 123 kilos of a 65% NaOH liquor also at 68.6° C. The heat of dilution of the latter raises the temperature of the mixture to 95° C. and 81 kilos of sodium carbonate are precipitated and collected by suitable means, leaving 384 kilos of a mother liquor containing 80 kilos of NaOH and 22 kilos of Na$_2$CO$_3$.

The 384 kilos of mother liquor is then mixed in a second crystalliser with the other portion of carbonated liquor amounting to 345 kilos and 29.2 kilos of sodium carbonate monohydrate are precipitated and 695 kilos of mother liquor left at 81.1° C. containing 101 kilos of Na$_2$CO$_3$ and 80.0 kilos of NaOH. This mother liquor is thus ready for recycling to the carbonating column. The 29.7 kilos of sodium carbonate monohydrate is returned to the main crystalliser or, if desired, to a secondary vessel containing the magma from the main crystalliser, and is there converted into 25.4 kilos of sodium carbonate.

What I claim is:

1. A process for making sodium carbonate monohydrate which comprises: reacting an aqueous sodium carbonate liquor with an aqueous caustic soda liquor containing at least 56% and not more than about 63% by weight of sodium hydroxide whereby sodium carbonate monohydrate is precipitated without application of additional heat, the amount of said caustic soda liquor and the concentration of said sodium carbonate liquor being such that the mother liquor resulting from the precipitation contains less than 20% by weight of sodium hydroxide and more than 6% by weight of sodium carbonate; separating said precipitated sodium carbonate monohydrate; reacting said mother liquor at a temperature above 30° C. with sufficient of a carbon dioxide-containing gas to give a carbonated liquor in which substantially all sodium hydroxide has been converted to sodium carbonate; reacting said carbonated liquor wtih an aqueous caustic soda liquor containing at least 56% and not more than about 63% by weight of sodium hydroxide wherbey further sodium carbonate monohydrate is precipitated without application of additional heat; removing from the process water vaporized from said liquors by the heat which is liberated during said carbonation and precipitation reactions; and separating said further precipitated sodium carbonate monohydrate.

2. A process for making substantially anhydrous sodium carbonate which comprises: reacting an aqueous sodium carbonate liquor with an aqueous caustic soda liquor containing at least 63% of sodium hydroxide by weight whereby anhydrous sodium carbonate is precipitated without application of additional heat, the amount of said caustic soda liquor and the concentration of said sodium carbonate liquor being such that the mother liquor resulting from the precipitation contains at least 20% by weight of sodium hydroxide and more than 6% by weight of sodium carbonate; separating said precipitated anhydrous sodium carbonate; reacting said mother liquor at a temperature above 30° C. with sufficient of a carbon dioxide-containing gas to give a carbonated liquor in which substantially all sodium hydroxide has been converted to sodium carbonate; reacting said carbonated liquor with an aqueous soda liquor containing at least 63% by weight of sodium hydroxide whereby further anhydrous sodium carbonate is precipitated without application of additional heat; removing from the process water vaporized from said liquors by the heat which is liberated during said carbonation and precipitation reactions; and separating said further precipitated anhydrous sodium carbonate.

3. Process as claimed in claim 2 in which the liquor from the carbonation stage is divided into two portions, one of which is mixed with a caustic soda liquor containing at least 63% NaOH thereby forming a crystallisation stage in which anhydrous sodium carbonate is precipitated and separated from a first mother liquor, said first mother liquor being thereafter mixed with the other other of the two portions of liquor issuing from the carbonation stage whereby sodium carbonate monohydrate is precipitated and separated from a second mother liquor, which is recycled to said carbonation stage, said sodium carbonate monohydrate being thereafter returned to said crystallisation stage, whereby it is converted into anhydrous sodium carbonate which is then precipitated and separated.

4. Process as claimed in claim 1 in which the sodium carbonate liquor is reacted with the caustic soda liquor at a temperature between about 50° and 80° C.

5. Process as claimed in claim 1 in which the sodium carbonate liquor is reacted with the caustic soda liquor under a pressure less than atmospheric.

References Cited in the file of this patent
UNITED STATES PATENTS 2,133,455 Keene _____ Oct. 18, 1938
2,842,489 Svanoe _____ July 8, 1958